Feb. 22, 1949. R. C. RUSSELL 2,462,779
GEAR SHIFTING MECHANISM
Filed April 19, 1945 5 Sheets-Sheet 4

INVENTOR.
Robert C. Russell.
BY
Harness, Dickey & Pierce.
ATTORNEYS.

Patented Feb. 22, 1949

2,462,779

UNITED STATES PATENT OFFICE 2,462,779

GEAR SHIFTING MECHANISM

Robert C. Russell, Cleveland Heights, Ohio, assignor to Eaton Manufacturing Company, Cleveland, Ohio, a corporation of Ohio Application April 19, 1945, Serial No. 589,201

20 Claims. (Cl. 74—365)

This invention relates to gear shifting mechanism and particularly to mechanism wherein a change speed gear mechanism may be power shifted between two different positions and controlled from a remote point, the principal object being the provision of mechanism of the type described having certain advantages over prior art structures of a similar type. It is a continuation in part of my application for Letters Patent of the United States on the same subject filed June 12, 1944 and serially numbered 539,911 now abandoned.

Objects of the invention include the provision of means for shifting a torque transmitting element of a change speed mechanism between two different positions of operation, so constructed and arranged as to permit pre-selection of the shiftable position but without any shifting actually taking place until the torque transmitted through the shiftable element is materially reduced from that normally transmitted through it during operation; the provision of a construction as above described in which the power for effecting the shifting of the shiftable element is built up immediately upon preselection of the shiftable position so as to be instantaneously available for the shifting operation upon a reduction in torque transmitted through the shiftable element; the provision of a construction as above described in which the power for effecting the shifting of the shiftable elements is stored up upon pre-selection in a spring element and is available for the shifting operation the moment the torque being transmitted through the shiftable element is reduced to a point where shifting of the shiftable element is possible under the amount of power thus stored up in the spring element; the provision of a construction as above described in which an electric motor is employed for storing up the power or energy in the aforementioned spring element; the provision of a construction as above described in which the act of pre-selecting a gear change of the speed change mechanism automatically energizes an electric motor to cause energy to be immediately stored up in said spring means, thereby to render it fully active upon said reduction in torque through the shiftable member; the provision of a construction as above described in which the electric motor is reversible and is operable to store up energy in the spring means effective in both directions whereby to enable the above described effect to be obtained regardless of the direction in which the shiftable element is to be shifted; the provision of a construction as above described in which a novel form of means is employed for controlling the direction of rotation of the electric motor; and the provision of a construction as above described in which the spring means comprises a single torsion spring.

Other objects of the invention include the provision of an operating device comprising a pair of relatively rotatable parts and a torsion spring interconnecting them; the construction and arrangement being such that energy may be stored up in the spring by rotation of one of the members either one way or another from a normal spring position, which is a wound-up or preloaded assembly position of the spring, so as to be capable of effecting movement of the other of said members in a corresponding direction; the provision of a construction as above described in which relative rotation between the members of at least 180 degrees is possible; the provision of a construction as above described in which relative rotation of one of the members in either direction tends to stress the spring for operating the other member in the same direction; and the provision of a spring energized unit of new and novel construction.

The above being among the objects of the present invention, the same consists in certain novel features of construction and combinations of parts to be hereinafter described with reference to the accompanying drawing, and then claimed, having the above and other objects in view.

In the accompanying drawings, which illustrate suitable embodiments of the present invention and in which like numerals refer to like parts throughout the several different views.

Fig. 5 is a vertical sectional view taken on the line 5—5 of Fig. 3;

Fig. 10 is a fragmentary, horizontal sectional view taken on the line 10—10 of Fig. 9;

Fig. 11 is a schematic, enlarged transverse, sectional view through the torsion spring mechanism as on the line 11—11 of Fig. 10 and showing the same in neutral position; and, Figs. 12 and 13 are views similar to Fig. 11 but illustrating the torsion spring mechanism tensioned in positions of opposite rotation.

While the present invention has application to any construction including a shiftable element through which torque is applied in operation and wherein shifting of the element during the transmission of material torque therethrough is impossible, or at least impractical, because of the friction that would have to be overcome to shift it while under a torque load, it is particularly adaptable for use in connection with a shiftable element of change speed mechanisms for motor vehicles and for this reason the latter application will only be referred to herein, those skilled in the art thus being able to recognize its application to broader uses of the type described.

In adapting the present invention to the change speed mechanism of a motor vehicle, it obviously may be applied to such change speed mechanism whether the latter is embodied in a conventional transmission mounted directly upon one end of the engine therefor or whether it is of the type embodied in the driving axle structure for such vehicle. Inasmuch as in the latter type of construction it is more difficult to extend mechanical connections from the change speed mechanism to a point convenient to the operator of the vehicle than in the former case, and in view of the fact that in accordance with the present invention no such mechanical connections are necessary, the construction is particularly adaptable to the rear axle type of construction and, accordingly, is shown in connection therewith in the accompanying drawing, its application to the former type of construction thus being made apparent to those skilled in the art.

In mechanisms of the type described, structures have heretofore been suggested which employ a vacuum cylinder to move the shiftable element in one direction and against spring pressure which is relied upon to shift the element in the opposite direction upon dissipation of the vacuum. There are certain limitations in such type of constructions that are difficult to overcome. For instance, because of clearance required for the frame structure of the vehicle, the diameter of the vacuum cylinder is necessarily limited and additionally it is required to overcome the force of the spring which is employed for shifting the element in a reverse direction. The spring load is unchanged under most conditions, but the vacuum power for shifting varies with altitude being high at sea level and low in mountainous regions. In accordance with the present invention, a mechanism is provided wherein the force provided for shifting the shiftable element may be the same regardless of the direction of shifting and may be built up to any desired degree so as to insure positive and effective shifting under any circumstances. Furthermore, it is such that the actuating pressure is built up immediately upon pre-selection of the desired shiftable movement and is instantaneously available the moment the torque on the shiftable element is reduced sufficiently to permit the mechanism to overcome its friction and without affecting normal operation of the engine; closing the throttle being unnecessary to establish sufficient power to effect the shifting as in the case of vacuum operated devices of this type.

Figure 2:
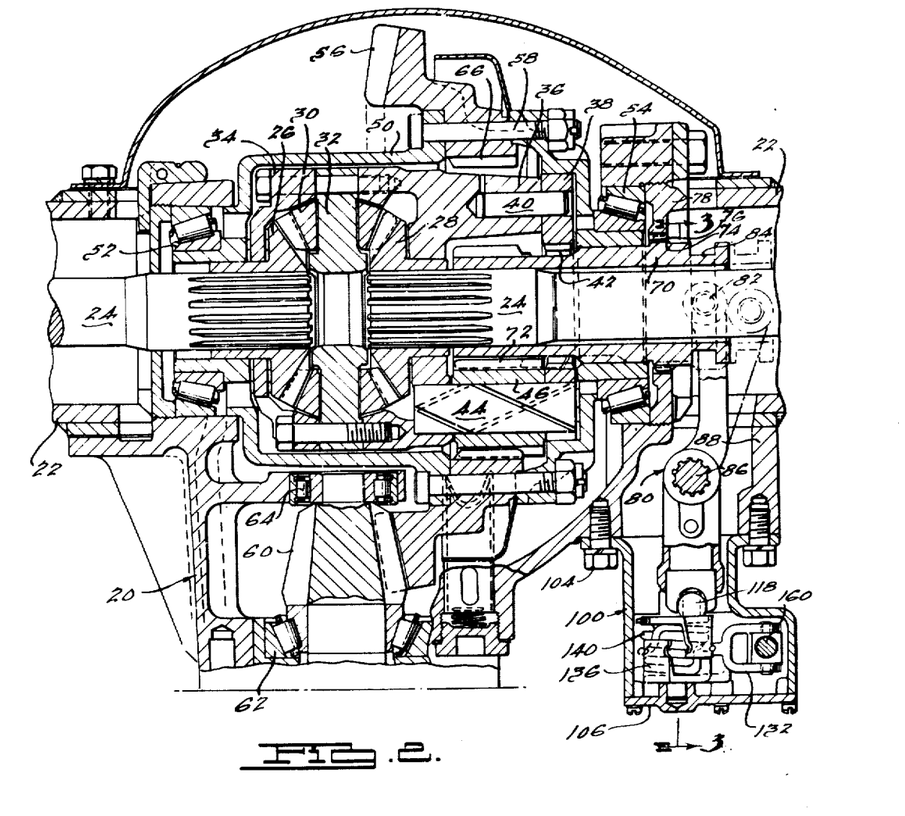
Fig. 2 is a fragmentary horizontal, sectional view taken centrally through the differential and change speed mechanism of a two-speed rear axle structure, illustrating the present invention applied thereto for the purpose of shifting the shiftable element of the two-speed axle structure.

First, referring to Fig. 2 to explain the construction and operation of a two-speed axle mechanism to which the present invention is shown applied, it will be seen to include a cast differential housing indicated generally at 20, from opposite sides of which project the usual axle housing tubes 22 through which the axles or jack shafts 24 project and are enclosed. The inner splined ends of the axle shafts 24 are non-rotatably received in the complementary bores of the beveled gears 26 and 28, respectively, in a conventional manner, and the latter are operatively interconnected by a plurality of beveled gears 30 in mesh with both thereof and carried on pins 32 fixed in the differential carrier 34 which thus surrounds the differential gears. The differential carrier 34 is rotatably mounted upon the extended hubs of the gears 26 and 28, respectively, and its right-hand end as viewed in Fig. 2 is extended as at 36 and has mounted on such extended end in concentric relation therewith a clutch ring 38 fixed against relative rotation with respect thereto by means of pins 40. The clutch ring 38 is provided with internal clutch teeth 42 arranged concentrically with and in radially outwardly spaced relation to the right-hand shaft 24.

The differential carrier 34 at a plurality and preferably at three equally angularly spaced points about its rotatable axis and at equal distance from the axis radially outwardly beyond the corresponding axle shaft 24 is provided with a corresponding number of axially parallel pins 44. The pins 44 are supported at their ends, and between their ends each rotatably supports thereon a pinion planet gear 46, the carrier 34 being cut away to permit each gear 46 to project radially outwardly therebeyond or at least to be exposed therethrough.

Arranged in surrounding relationship with respect to the differential carrier 34 is a ring gear carrier 50, the opposite ends of which are rotatably mounted by means of antifriction bearing assemblies 52 and 54, respectively, carried by the differential housing 20. A ring gear 56 disposed concentrically with the axle shafts 24 is fixed to the carrier 50 by means of bolts 58 and lies in mesh with the pinion gear 60 suitably mounted in the differential housing 20 by means of antifriction bearing assemblies 62 and 64, respectively. It will be noted from an inspection of Fig. 2 that the ring gear 56 is of annular character and its bore is formed with teeth 66 forming an internal gear concentric with the axle shafts 24 and lying in mesh with the planet pinions 46.

The ring gear carrier 50 at its right-hand end is bored out concentrically with the corresponding axle shafts 24, but to a greater diameter. Axially slidably mounted in the bore in the righthand end of the carrier 50 and surrounding the right-hand axle shaft 24 is a sleeve member 70 the axially inner end of which is provided with gear teeth 72 providing a pinion sun gear of such diameter as to mesh with the pinion gears 46 when radially aligned therewith, as well as of such diameter as to be interlocked with the clutch teeth 42 of the differential carrier 34 when interengaged therewith. In other words, the diameter of the pinion gear 72 is such as to be capable of being received in interfitting relation within the teeth 42 when the sleeve 70 is shifted axially to bring about this condition, thereby to lock the sleeve 70 against relative rotation with respect to the differential carrier 34.

The sleeve 70 is also provided with a concentric circular series of teeth 74 on its periphery adjacent its right-hand end, as viewed in Fig. 2. The teeth 74 are adapted to be interengaged with complementary teeth 76 formed on a ring member 78 suitably fixed against rotation with and carried by the differential housing 20. The teeth 76 are so located axially of the structure that when the pinion gear 72 is fully in mesh with the internal gear 66 formed on the ring gear 56, the teeth 74 and 76 are engaged with each other, thereby locking the sleeve 70 and its sun gear 72 against rotation.

It will thus be appreciated that the teeth 42 serve in the nature of clutch teeth adapted to engage the teeth of the pinion or sun gear 72 to lock the latter and, therefore, the sleeve 70 against relative rotation with respect to the differential carrier 34, and that the teeth 74 and 76 serve as inter-engageable clutch teeth which, when engaged with each other, lock the sleeve 70 against rotation with respect to the differential housing 20. When the teeth 74 and 76 are in engagement with each other and the sleeve 70, therefore, held stationary, it will be appreciated that the pinion 60 in turning the ring gear 76 about the axes of the shafts 24, because of interengagement of the internal gear teeth 66 with the pinion or planet gears 46, will cause the pinions or planet gears 46 to bodily travel about the pinion or sun gear 72 at a slower rate of rotation than the ring gear 56 travels about the axes of the shafts 24. The pinion or planet gears 46 being fixed to the differential carrier 34, they will thus cause the differential carrier 34 and consequently the shafts 24 to rotate at a slower speed of rotation than the speed of rotation of the ring gear 56. Thus a low speed axle drive is provided when the sleeve 70 is in the axial position shown in Fig. 2.

If now the sleeve 70 is shifted to the right as viewed in Fig. 2 from the position shown, the teeth 74 and 76 will be released from engagement with respect to each other and the sleeve 70 will then be free to rotate in the differential housing 20. If the teeth 74 and 76 are separated axially from one another only enough to effect axial separation and not enough to bring the teeth of the pinion 72 into engagement with the teeth 42 of the differential carrier 34, then the driving connection between the ring gear 56 and the shafts 24 is broken and the gearing is then in a position which corresponds to a neutral or inoperative positive of a change speed transmission. On the other hand, if the sleeve 70 is shifted axially enough to bring the teeth 74 and 76 out of engagement with each other and to bring the teeth of the pinion 72 into operative engagement with the teeth 42 of the differential carrier 34, at which time the teeth of the pinion 72 are still in operative engagement with respect to the teeth of the pinions 46, the differential carrier is thereupon locked for equal rotation with respect to the ring gear carrier 50 and consequently upon rotation of the ring gear 56, as by means of the pinion 60, the axle shafts 24 are caused to rotate equally with the ring gear 56. This last described position of the sleeve 70 is the high speed position of operation of the two speed axle shown.

As before mentioned, the device of the present invention has for its object the shifting of a shiftable element of a change speed transmission and which, in the two speed axle construction illustrated in Fig. 2, is the sleeve 70. The device of the present invention effects axial shifting movement of the sleeve 70 by means of a double armed lever indicated generally at 80, one end of which is yoked and fits over the axially outer end of the sleeve 70. The opposite arms of the yoke are each provided with an inwardly directed pin 82, as best brought out in Fig. 3, which pins are received in a peripheral groove 84 in the sleeve 70 on diametrically opposite sides of the axis of the latter. The lever 80 is nonrotatably mounted upon a pin 86 mounted at its opposite end with a hollow boss 88 integral with the differential housing 20, the pin 86 being retained against axial displacement in the boss 88 by means of a rounded end 90, shown in Fig. 3, on a screw 92 and engaged in a peripheral groove 94 of the pin 86. Power is applied to the outer end of the arm 80 by the device of the present invention in order to cause it to pivot about the axis of the pin 86 and thereby effect axial shifting movement of the sleeve 70.

The device of the present invention includes a cast metal housing indicated generally at 100 having an open inner end of substantially the same cross-sectional area and configuration as the open outer end of the hollow boss 88 and provided with an outturned flange 102 which is fixed to the outer end of the boss 88 by means of screws 104, as well as the screw 92 previously mentioned and employed for retaining the pin 86 against axial displacement. The lower outer end of the housing 100 is also open and is closed by a cover plate 106. Mounted between the housing 100 and cover plate 106 below the center line of the double armed lever 80 and preferably with its axis in radial relation with respect to the axis of the pin 86, is a pin 108 upon which is rotatably mounted a pair of members 110 and 112 arranged in end-to-end and preferably abutting relationship, as brought out in Fig. 3.

The inner member 110 is provided with a radially extending arm portion 114 at its inner end to which is fixed in eccentric relation with respect to the pin 108 and centrally of the double armed lever 80 a pin 116 arranged with its axis parallel to the pin 108. Rotatably mounted upon the pin 116 is a ball member 118. As best brought out in Fig. 4, the ball member 118 is slidably received in a diametrical slot 120 formed in the enlarged outer end of a member 122 received within a radially directed bore formed in the outer arm of the double armed lever 80, the diametrical slot 120 being arranged with its longitudinal center line in parallel relation with respect to the axis of the pin 86.

Figure 6:
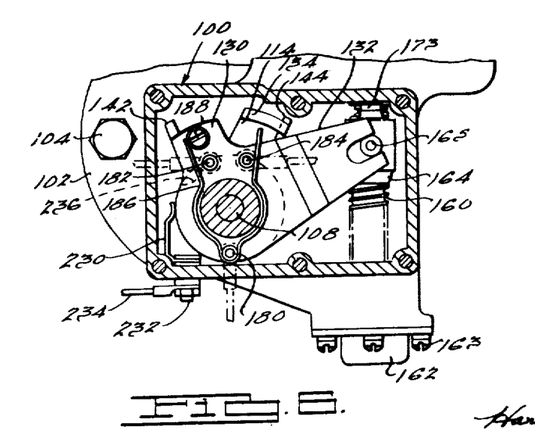
Fig. 6 is a fragmentary, vertical sectional view taken on the line 6—6 of Fig. 3.

The member 112 at its axially outer end, and as best brought out in Figs. 5 and 6, is provided with a pair of integral radially outwardly directed arms 130 and 132, respectively, these arms being angularly spaced from one another about the axis of the pin 108.

Figure 3:
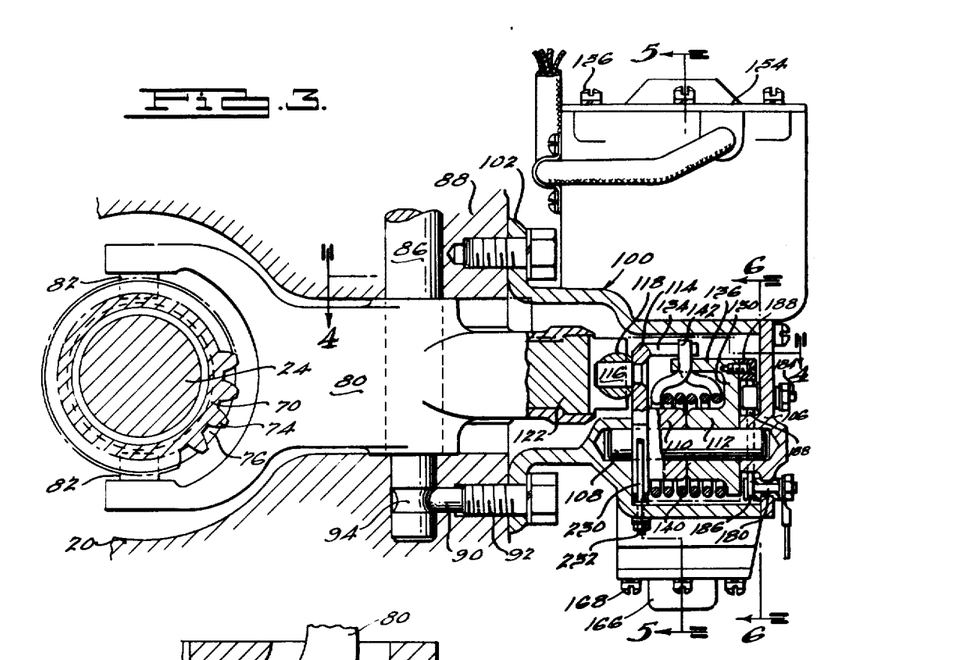
Fig. 3 is an enlarged fragmentary, vertical sectional view taken on the line 3—3 of Fig. 2.
Figure 4:
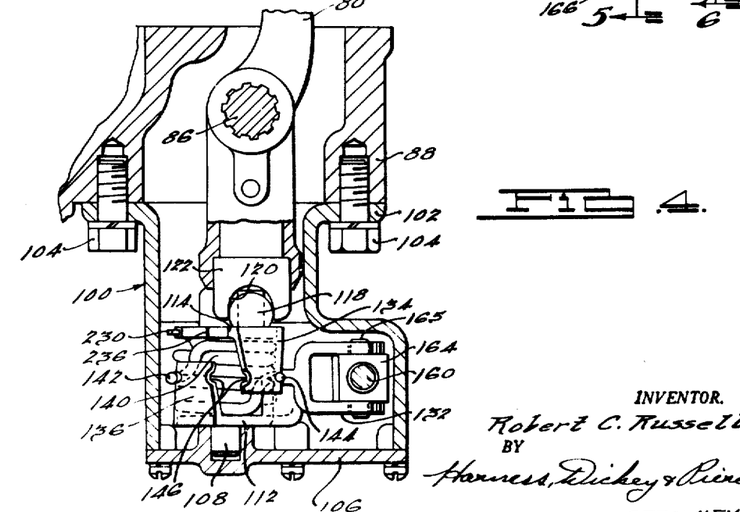
Fig. 4 is a fragmentary horizontal, sectional view taken approximately on the line 4—4 of Fig. 3 and illustrating the spring unit in plan view.

As best brought out in Figs. 3 and 4, the arm 114 of the member 110 is provided at its radially outer end with an axially outwardly directed flange or finger portion 134, and the arm 130 of the member 112 is provided at its outer end with an axially inwardly directed flange or finger portion 136, the finger portions 134 and 136 extending into overlapping relation axially of the pin 108 and the finger portion 136 being located radially inwardly with respect to the axis of the pin 108 from the flange or finger portion 134 so as to enable it to swing freely past the overlapping portion of the finger 134 during relative rotation of the members 110 and 112.

A relatively heavy coil torsion spring 140 is arranged in freely surrounding relation with respect to the members 110 and 112 between the arms 114 and 130, respectively, thereof. The axially inner free end of the spring 140 is brought radially outside of the coil, then bent axially forwardly and then radially outwardly as at 142 in alignment with the overlapped portions of the fingers 134 and 136, and the axially outer free end of the coil is similarly bent radially outwardly beyond the coil, then axially inwardly, and then radially outwardly as at 144 and into a plane perpendicular to the axis of the pin 108 within the overlapped portions of the fingers 134 and 136. As best brought out in Fig. 3, the ends 142 and 144 project radially of the pin 108 beyond the outer finger 134 and, as brought out in Fig. 4, the fingers 134 and 136 are preferably notched as at 146 on opposite sides of each thereof for reception of the ends 142 and 144 and so as to prevent inadvertent axial displacement of such ends with respect to the fingers in operation.

Because of the construction described, it will be appreciated that the member 112 may be turned in either direction of rotation and because its finger 136 can pass under the end of the finger 134 it is enabled to engage either end 142 or 144 of the spring 140 and apply a turning force to the spring in either direction as a result thereof. In the position of the members 110 and 112 and, therefore, the fingers 134 and 136 shown in Figs. 4, 5, and 6, it may be assumed that the member 112 is being turned in a direction to move the finger 136 to the left, thus causing the lefthand edge of the finger 136 to engage the end 142 of the spring 140, thereby tending to turn the spring 140 about the axis of the pin 108 and to cause the end 144 to engage the righthand edge of the finger 134 and thereby to tend to turn the member 110 in a corresponding direction. If the double armed lever 80 is free to turn under such conditions, the force of the spring 140 acting against the finger 134 will turn the member 110 in a corresponding direction thus causing the ball 118 to be moved to the left, as viewed in Fig. 4, and cause the double armed lever 80 to be moved in a clockwise direction of rotation about the axis of the pin 86 thereby to shift the sleeve 70 to its position of high speed operation for the rear axle mechanism. On the other hand, if the member 112 is turned in the opposite direction from the position shown in Fig. 4, it will pass below the finger 134 and be brought into engagement with the end 144 of the spring 140 at substantially the same time that the end 142 is brought into engagement with the finger 134 of the member 110, and upon continuing such direction of movement will tension the spring 140 in a direction to move the finger 134 and consequently the member 110 to the right, as viewed in Fig. 4, thus acting through the ball 118 to cause the double armed lever 80 to pivot in a counterclockwise direction about the axis of the pin 86 and thereby tend to shift the sleeve 70 to the position illustrated in Fig. 2.

If either of the above described movements of the member 112 is caused at a time that a force is holding the double armed lever 80 against pivotal movement sufficient to overcome the force of the spring 140, it will be appreciated that the spring 140 can be wound up either clockwise or counterclockwise from its normal position, or preloaded position, and if such spring force on the member 112 is maintained the spring 140 will remain under such stress until the force resisting movement of the double armed lever 80 is relieved, at which time the force thus built up in the spring will become effective to shift the double armed lever 80 and cause a corresponding shifting movement of the shiftable element of the transmission, in the case shown by way of illustration, the sleeve 70.

Those skilled in the art appreciate the fact that when a material amount of torque is being transmitted through the shiftable element of a change speed transmission, the friction between the teeth of the shiftable element and the meshing gear element through which the torque is also being transmitted offers an unusually high amount of resistance to shifting of the shiftable element. This, in fact, is of an advantage up to a certain extent inasmuch as when a driving force is being exerted through the shiftable element it is normally undesirable to effect shifting of the same, for well understood reasons. At the same time, when the torque being transmitted through the shiftable element has been substantially relieved, it is desirable that it be shifted promptly and surely. Thus in the present case the member 112 may be rotated in either one direction or the other, depending upon which direction it is desired to pivot the double armed lever 80, and as long as a material amount of torque is being transmitted through the pinion 72 on the sleeve 70, the friction between the teeth of the pinion 72 and the teeth of the pinions 46 will be sufficient to overcome the force of the spring 140. However, the spring 140 may be made of such strength that under such conditions when the torque being transmitted through the pinion 72 is substantially relieved, the force of the spring will effectively and surely shift the sleeve 70 to the desired opposite position of operation.

The means provided for shifting the member 112 as above described is of particular importance in connection with the present invention. This is accomplished in the following manner. As best illustrated in Figs. 5 and 6, it will be noted that an electric motor 150 is housed within and locked against axial and rotational movement within the housing 100. This is accomplished by providing an annular seat 152 in an upward extension of the housing 100 and against which the lower edge of the housing for the electric motor 150 seats. This portion of the housing 100 is open at its upper end and is closed by a cover member 154 secured thereto by screws 156. The cover member 154 bears against the motor 150 and serves to securely clamp it against the seat 152, thus effecting the desired result.

The motor 150 is arranged with its axis vertical and horizontally offset from the axis of the pin 108. Its shaft 158 projects downwardly into the housing and into the bore of the vertically disposed screw element 160 in which it is suitably secured against relative rotation. The lower end of the screw element 160 is fixed against relative axial movement to an antifriction bearing assembly 161 in turn held against axial movement in the lower end of the housing 100 by means of a cap 162 and screws 163. The bearing assembly 161 serves to rotatably support the screw element 160 in the housing 100.

The screw element 160 is provided with a nut 164 adapted to travel vertically thereon, the nut 164 being provided with a pair of diametrically oppositely projecting pins 165. The outer end of the arm 132 is bifurcated and receives the nut 164 therein, the bifurcated end being slotted as at 166 for reception of the pins 165 therein.

The screw 160 and nut 164 are of an unusual nature any by their use material advantages are obtained, both from the standpoint of substantially eliminating the loss of power through them from friction, and from the standpoint of eliminating the necessity of employing a brake for the motor 150. This part of the construction forms no part of the present invention except in its combination with shifting mechanism, its broad application as a power transmitting means forming the subject matter of my copending application for Letters Patent of the United States for improvements in Mechanical movement, filed June 14, 1945, and serially numbered 599,417, now Patent No. 2,446,393, dated August 3, 1948.

In this connection, while the simple screw and nut construction shown in the application heretofore identified and of which the present application forms a continuation in part is operable, it was found to require an excessively large electric motor 150 because of the high friction loss (approximately 70%) in the conventional screw and nut construction employed in the place of the screw 160 and nut 164 of the present application. Additionally, it was found in my prior construction that where the electric motor was operated to shift the shiftable element when no load was being transmitted through the gears the motor would reach such a high speed of rotation by the time the current was broken through it that the inertia of the motor would cause the nut to move axially of the screw until the nut would strike some fixed part as, for instance, the housing for the motor 150 or the housing 100, and become jammed. For this reason it was necessary to provide a brake on the motor to quickly stop its rotation when the circuit through it was broken. By the use of the screw and nut construction shown in the present application a much smaller electric motor may be used, and the expense and complication of a brake for it is eliminated.

Figures 7, 9:
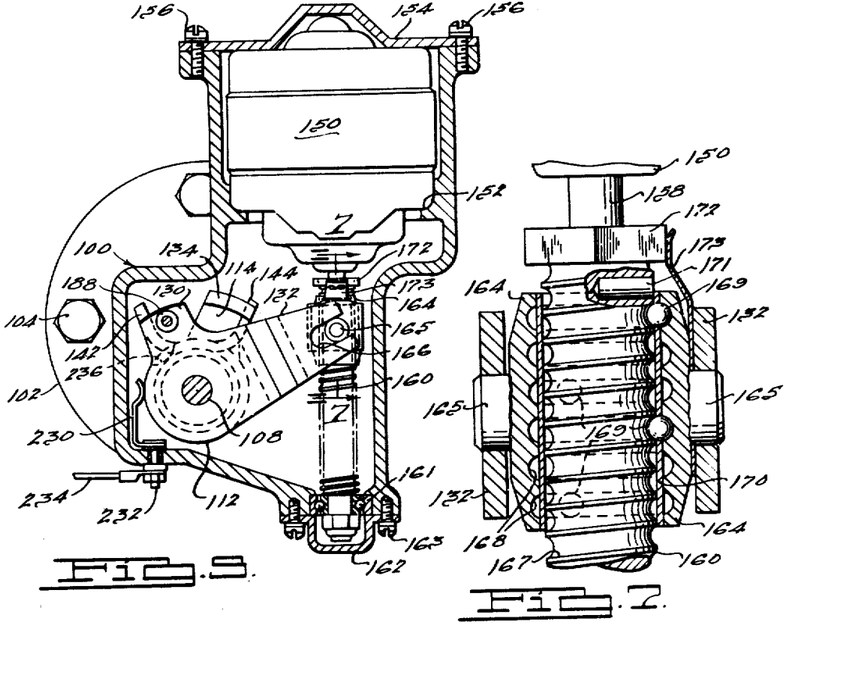
Fig. 7 is an enlarged, fragmentary, partially broken, partially sectioned view taken on the line 7—7 of Fig. 5.
Fig. 9 is a view similar to Fig. 3 but illustrating a modified form of torsion spring structure or unit and operating mechanism therefor applied to the structure shown in the preceding figures.

Referring now to Fig. 7 it will be noted that the screw 160 has a helical groove 167 therein which forms the thread thereof and that this groove is substantially semi-circular in cross-sectional configuration. In one practical embodiment of the invention the screw is one-half inch in diameter with seven threads per inch of length. The nut 164 has no threads formed in it. Instead its bore is provided with one or more, preferably a plurality of, circumferentially and axially spaced annular grooves 168. The grooves 168 are of the same cross-sectional configuration as the grooves 167, and one ball 169 is positioned between each groove 168 and the groove 167, substantially fitting both. A plurality of the grooves 168, and corresponding number of ball 169, are preferred as the load transmitted is correspondingly divided between the balls. A cage 170 is interposed between the screw 160 and nut 164 and is provided with openings therein through which the balls 169 project and which, therefore, act to maintain the balls 169 in their proper relative positions with respect to each other angularly about the axis of the screw.

It will be appreciated that rotation of the screw 160 will, because of its frictional contact with the balls 169, cause the balls to roll around it and the grooves 168 in the nut 164, but at a slower speed about the axis of the nut than the screw itself. The balls in thus rolling will cause relative axial movement between the nut and screw but at a less effective pitch than the pitch of the groove 167. In the particular example given the screw will turn approximately twelve times to move the nut one inch axially thereon. This has the effect of increasing the mechanical advantage of the device. The connection between the screw and nut results in a positive connection between them as long as the balls 169 are free to roll in the groove 167, and the greater the load the more positive the drive.

The efficiency of the screw and nut construction shown is approximately 98%, or more than three times that of a conventional screw and nut employing square threads. Thus an electric motor 150 of one-third the horsepower required in my former construction may be employed with consequent saving in bulk and cost. There is, however, an equally important advantage that eliminates the second named disadvantage of the screw and nut in my former application, and this is in connection with the elimination of the necessity of providing a brake on the motor to limit the axial travel of the nut on the screw.

With the construction shown and described, if the balls 169 are prevented from rolling along the groove 167 at any time, the nut 164 may still be rotated but will not travel axially of the screw. In such case the balls simply travel around their respective grooves 168 and pure rotation, without axial displacement, of the nut on the screw results. Advantage is taken of this last fact by stopping travel of the balls 169 in the groove 167 when the nut 164 has traveled axially of the screw 160 in either direction sufficiently to place the spring 140 under the desired torsional stress and in the desired direction. This automatically stops the travel of the nut 164 at the desired limit of its movement and although the motor should continue to rotate, because of inertia or otherwise, no jamming can occur as the nut rotates freely under such circumstances.

The stopping of the travel of the balls 169 in the groove 167 may be accomplished by blocking the balls directly, or by stopping movement of the cage 170. In the particular case shown means comprising pins 171 are provided for direct contact with the endmost balls 169. The pins 171 are press fitted in holes formed radially in the screw 160 and centrally of the groove 167, one being provided adjacent each end of the screw 160 at that point in the length thereof where it is desired to stop the corresponding end of the nut 164. The pins 171, as brought out in Fig. 7, project into the groove 167 just far enough to engage the cooperating ball 169 and prevent its further travel in the groove 167 in that direction. Engagement of either end ball 169 with its cooperating pin 171, not only prevents further movement of such ball in the groove 167 in the direction of the pin, but through the cage 170 acts to stop travel of all the balls 169 in the groove 167 in such direction. Thus the rest of such balls are stopped indirectly by the pins 171.

Thus by the means described a screw and nut construction of unusually high efficiency is provided, one in which overrunning of the nut beyond its desired limit of movement in either direction is prevented, and no motor brake is required to stop the motor. As a result a less bulky and materially less expensive construction than that required in my earlier application is provided as well as one which is more efficient and free from trouble.

With the above described screw and nut construction the movement of the nut on the screw is so free that when the nut is at the upper limit of its travel on the screw the vibration of the associated vehicle which is transmitted to it has a tendency to cause the nut to work down on the screw under the force of gravity. To prevent such movement the following described mechanism, or its equivalent, is preferably provided.

Figure 8:
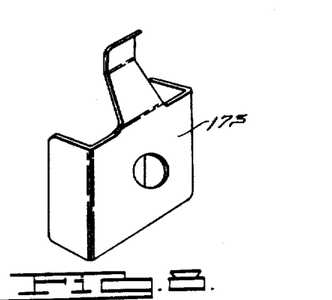
Fig. 8 is an enlarged perspective view of the brake element employed between the nut and screw of the structure shown in Fig. 7.

The screw 160 is provided with a non-circular head 172 on its upper end, it being shown as hexagonal in the drawing by way of illustration as this shape has proven satisfactory in practice. A vertically directed spring arm 173, shown in perspective in Fig. 8, has an opening in the lower portion thereof which receives one of the pins 165, and bent side flanges which engage the adjacent side faces of the nut to prevent its turning on the pin. It is confined or anchored in such position between the nut 164 and the cooperating arm of the yoke on the outer end of the arm 132. Its free end extends upwardly and is bent radially inwardly of the axis of the nut 164, to a position slightly radially inwardly of the periphery of the head 172 when free therefrom. Its extreme tip is bent outwardly so as to enable it to ride up on the head 172 when coming into engagement therewith. The spring arm 173 is of such length that shortly before the upper ball 169 engages its cooperating stop pin 171 as the nut 164 travels upwardly on the screw 160, the upper free end of the spring arm engages and rides up on the head 172, and by the time the upper ball 169 engages its pin 171 to prevent further upward movement of the nut 164 the free end of the spring arm 173 is riding on the periphery of the head 172. Because the head 172 is of non-circular configuration the pressure of the spring arm 173 upon it serves as a brake to resiliently hold the nut 164 against inadvertent turning on the screw under the conditions above mentioned, but offers no material resistance to the normal functioning of the screw and nut in their intended manner.

When the members 110 and 112 are in a position in which the arms 114 and 130 of the members 110 and 112, respectively, are vertically directed with respect to the axis of the pin 108 and aligned with each other axially of the pin 108, the spring 140 is in a position of minimum "loading." The word "minimum" is used as preferably even in such case, the spring 140 is so stressed as to tend to draw the ends 142 and 144 thereof towards each other. In other words, the spring 140 is "preloaded" to effect this tendency. This relation of the parts will seldom be realized in actual practice for the reason that the sleeve 70 will normally be in either one or the other of its limits of movement in an axial direction. The position of the parts illustrated in Figs. 4, 5 and 6 is that which they assume when the motor 150 has been operated to shift the sleeve 70 from the position illustrated in full lines in Fig. 2 to its opposite position of movement but before any axial movement of the sleeve 70 has occurred. In other words, it may be assumed that in the position of the parts illustrated in Figs. 4, 5 and 6, the torque is being actively transmitted through the transmission mechanism and the friction between the pinion 72 and the pinions 46 is sufficiently great to overcome the force of the spring 140. It will be observed that in this position of the parts the motor will have moved nut 164 to its upper position on the screw 160, the finger 136 of the arm 130 has pressed the end 142 of the spring 140 in a counterclockwise direction of rotation about the axis of the pin 108, and the spring 140 has been additionally loaded so that its end 144 bears against the finger 134 tending to move the arm 114 and, therefore, the member 110, in a counterclockwise direction so as to shift the outer end of the double armed lever 80 to the left, as viewed in Fig. 4, and to withdraw the sleeve 70 to the right, as viewed in Fig. 2, to its position of high speed operation. Under such conditions, as soon as the torque being transmitted through the pinion 72 is relieved, as will occur, for instance, where the operator of the vehicle lifts his foot from the accelerator pedal, the force of the spring 140 will immediately cause the member 110 to be rotated in a counterclockwise direction to bring its finger 134 into substantial radial alignment with the finger 136 and thereby cause shifting of the sleeve 70 to occur.

If the various parts are in the latter described position and it is desired to return the transmission to the position illustrated in Fig. 2, then the motor 150 is operated to move the nut 164 to the lower end of the screw element 160. This operation will cause the member 112 to rotate in a clockwise direction of rotation, as viewed in Figs. 5 and 6, at which time the finger 136 will pick up the end 144 of the spring 140 and the end 142 of the spring 140 will engage the finger 154 of the member 110, and as the nut 164 travels downwardly, the spring 140 will be stressed in a direction tending to rotate the member 110 in a clockwise direction of rotation and which movement of the member 110, and corresponding shifting movement of the sleeve 70 will occur as the torque on the pinion 72 is relieved sufficiently to permit the force of the spring 140 to overcome it.

It will be appreciated that by making the spring 140 of sufficient weight or strength, any desired amount of force may be applied to the sleeve 70 to urge it in either one direction or the other as soon as the torque being transmitted through it is reduced sufficiently to permit the force of the spring to overcome the friction between the pinion 72 and the gears 46, and that this force is instantaneously available the moment the torque being transmitted has thus been reduced.

Mechanism is provided for reversing the direction of rotation of the electric motor 150 and for discontinuing its motion whenever the nut 164 reaches either one end or the other of its permissable path of travel on the screw 160, and the mechanism provided for this purpose will now be described, having particular reference to Figs. 1, 3, 5, and 6.

The cover member 106 in vertical alignment with the axis of the pin 108 and below the latter is provided with a conductor pin 180 projecting through it perpendicular to its plane of thickness and insulated from the cover in the manner illustrated in Fig. 3. Above the axis of the pin 108 a pair of contact pins 182 and 184 also project through the cover 106 and are insulated therefrom in a manner similar to the pin 180. The pins 182 and 184 are horizontally spaced from one another and disposed equally on opposite sides of a vertical plane including the axis of the pin 180 and, accordingly, the axis of the pin 108. On the inside of the cover 106 a U-haped spring metal conductor element 186 is mounted midway between its ends upon the pin 180 and projects upwardly therefrom, its upper ends being tensioned toward one another so as to constantly tend to contact the inner ends of the pins 182 and 184.

The arm 130 of the member 112 is provided with an axially parallel and axially outwardly projecting pin 188 thereon, formed from electrical insulation material and which as perhaps best brought out in Fig. 3 is located between the free ends of the spring conductor element 186. The relation of the parts is such that when the member 112 is at either limit of its rotatable position about the axis of the pin 108 as controlled by the elecric motor 150 through the screw 160, the ping 188 will engage the corresponding free end of the spring conductor element 186 and press it out of contact with the corresponding pin 182 or 184 as the case may be.

It will thus be appreciated that when the nut 164 reaches its limit of movement in either direction on the screw 160 the pin 188 will engage a corresponding free end of the spring conductor element 186 and move it out of contact with the corresponding pin 182 or 184, leaving the other free end of the spring conductor element 186 in contact with the other pin 182 or 184. This breaking of the contact between the spring conductor element 186 and one of the pins 182 and 184 is relied upon to break the electrical circuit to the motor 150 when it has moved the nut 164 to either one or the other of its limits of movement on the screw 160.

Figures 1, 1A:
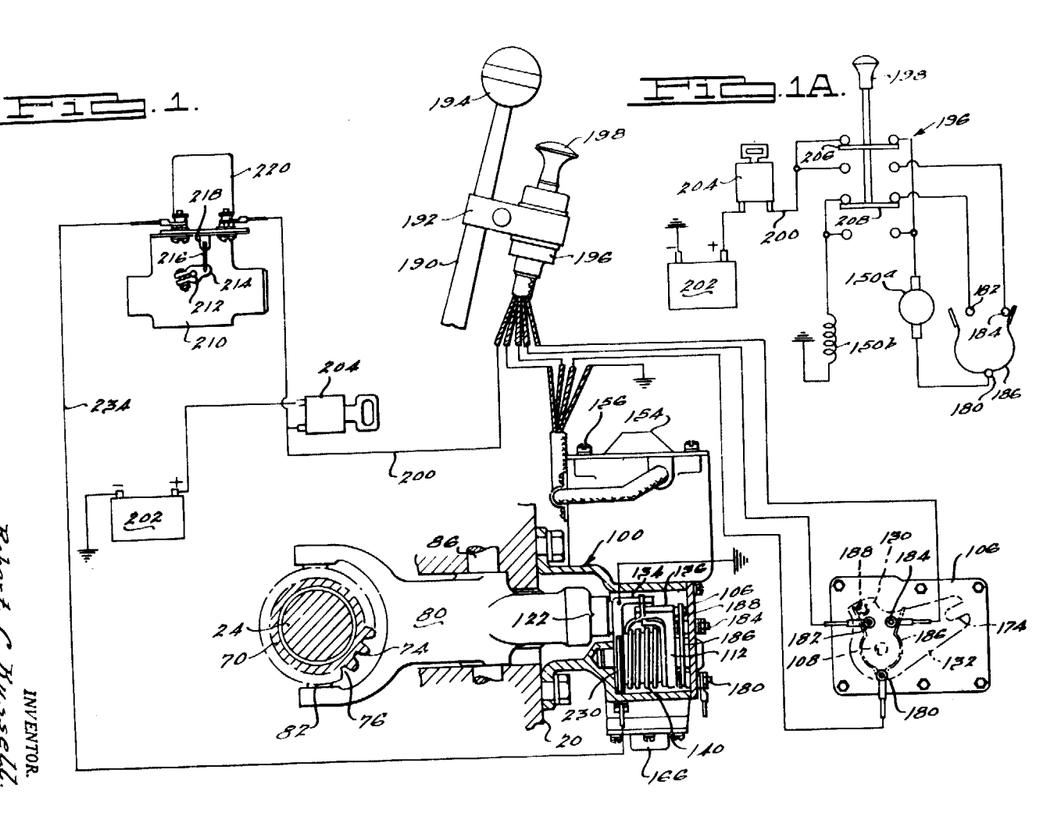
Fig. 1 is a partially broken, partially sectioned, and partially fragmentary view taken centrally through mechanism constructed in accordance with the present invention showing the same operatively associated with a shiftable element of a change speed gear mechanism and showing the electrical control system therefor in more or less diagrammatic representation and illustrating its relation to other operative parts of a motor vehicle.
Fig. 1a is a more detailed wiring diagram of the electrical control system shown in Fig. 1.

The circuit to the electric motor 150 through the spring conductor 186 above described may be controlled by a suitable switch positioned at a point for convenient operation by the operator of the motor vehicle of which the mechanism forms a part. In Fig. 1 it is shown mounted upon the gear shift lever 190 of the associated motor vehicle by means of a bracket 192 and in proximate relation with respect to the ball hand grip 194 thereof. While obviously any suitable or conventional type of switch may be employed, that shown for the purpose of explanation at 196 is of the push-pull type having an operating knob 198. The switch 196 is connected by a lead 200 to a storage battery 202, a key operated switch 204, and which may be the conventional ignition switch, preferably being interposed in the lead 200. The negative side of the battery 202 is grounded as indicated.

The electric motor 150 may be of a series type in which the direction of flow of electrical current through either the field or the armature is reversed to reverse the direction of rotation thereof. The wiring diagram for reversing the direction of rotation of the motor is shown in Fig. 1A in which the switch 196 is shown diagrammatically and the motor 150 is illustrated diagrammatically by the armature 150a and the field 150b. In this case it is assumed that it is the direction of flow of current through the armature 150a that is to be reversed to reverse the direction of rotation of the motor 150.

In Fig. 1A the switch 196 and spring conductor element 186 are illustrated in the position shown in the remaining figures of the drawing. In other words, the spring conductor 186 is out of contact with the contact 182 and it is assumed that the nut 164 has reached the upper limit of its movement corresponding with such position, and that the spring 140 has been stressed to shift the sleeve 70 towards its high speed position but the friction existing between the pinion 72 and planet gears 46 is too great at the moment to permit such shifting movement to occur.

The switch 196 is illustrated as being provided with two switch bars 206 and 208 which in the position of operation shown serve to conduct electrical current from the battery 202 downwardly through the armature 150a to the spring conductor element 186. If the spring conductor 186 was in contact with the contact 182, as would be the case when the switch 196 was initially moved to its upper position shown and at which time the nut 164 would be at the upper end of the screw 160, then the current would flow through the contact 182 and downwardly through the field windings 150b and through the ground to the negative side of the battery 202. It cannot flow through the spring conductor 186 through the contact 184 under the conditions shown because the circuit in this direction is broken through the switch 196. If, while the parts are in the position shown, the plunger 198 is moved downwardly to cause the bars 206 and 208 to bridge the remaining pair of contacts of the switch 196, then the current from the battery 22 will flow through the switch 196 to the contacts 184, through the spring conductor 186, contact 180 upwardly through the armature 150a (this being in the reverse direction from that first explained) and then through the field windings 150b to ground, this reversing the direction of rotation of the motor 150 and causing the nut 164 to travel to the opposite end of the screw 160 from the position shown in Fig. 5, and upon reaching which position the spring element 186 will be freed of contact with the contact 184, thus breaking the circuit to the motor. It will be appreciated that upon initial movement of the member 112 in either direction that end of the conductor spring element 186 which has been pressed out of contact with its corresponding contact 182 or 184 will be returned to contact therewith, thus conditioning the corresponding circuit for operation by movement of the switch 196 to its opposite position of operation.

It will thus be appreciated that the operator of the vehicle to which the present invention is applied, by either pulling or pushing the knob 198 of the switch 196 may pre-select the shiftable position of the transmission. If the vehicle is not in operation and no torque is being transmitted through the sun gear 72, then the sleeve 70 will be shifted immediately upon operation of the control knob 198 for the switch 196. On the other hand as above explained, if the vehicle is in operation and a material amount of torque is being transmitted through the sun gear 72, then when the operator operates the switch 196 to pre-select a shiftable position of the sleeve 70, the motor 150 will operate to stress the spring 140 in a direction corresponding with the desired direction of shiftable movement of the sleeve 70 and as soon as the operator takes his foot off of the accelerator of the vehicle and the torque being transmitted through the sun gear 72 is thus relieved, the moment it is relieved sufficiently to permit the spring 140 to overcome the friction exerted between the teeth of the sun gear 72 and the planet gears 46 the sleeve 70 and sun gear will be shifted to the selected position, and such shifting will occur in a quick and positive manner.

Inasmuch as two speed rear axles of the type illustrated in Fig. 2 are employed in conjunction with motor vehicles having a conventional transmission mounted on the rear end of the engine, and inasmuch as the speedometer for the vehicle is conveniently driven from the main transmission shaft, it will be appreciated that in order for the speedometer to read correctly where a two speed rear axle is employed it is also necessary to have a change speed mechanism in the drive between the main transmission shaft and the speedometer. This is conventional practice and in Fig. 1 the speedometer change speed gearing is illustrated generally at 210. It is provided with an operating shaft 212 to which is fixed an operating arm 214 connected by a link 216 to the armature 218 of a solenoid 220 mounted thereon. The solenoid 220 is of a conventional type in which the armature is spring pressed in one direction and electrically operated in the opposite direction against the force of such spring means. The solenoid 220 is connected with the positive side of the battery 202 through the switch 204 and the opposite side is conected through the mechanism of the present invention in such a manner that when the sleeve 70 is shifted to one limit of its shiftable position the solenoid 220 is actuated to place the speedometer change speed mechanism 210 in one of its shiftable positions and when the sleeve 70 is in the other of its shiftable positions the speedometer change mechanism 210 is shifted to its opposite position corresponding with the shifted position of the sleeve 70. This last is accomplished in the following manner.

As best brought out in Figs. 5 and 6 a spring contact arm 230 is mounted within the housing 100 and in wiping relation with respect to the flange formed on the axially inner end of the member 110. The contact finger 130 is secured in place by means of a screw 232 insulated from the housing 100 in the manner illustrated in Fig. 5 and the screw 232 is connected by the lead 234 with the solenoid 220. Inasmuch as the housing 100 is grounded and the member 110 in electrical contact therewith, when the spring finger 230 bears against the member 110 the solenoid 220 is energized. This is the relation of the parts shown in the drawings, and when the two speed rear axle mechanism is in the low gear also shown.

The said flange on the member 110 against which the spring finger 230 rides is provided in its periphery with a notch 236, perhaps best brought out in Fig. 4, which when the member 110 is in a position corresponding with the high speed position of the sleeve 70, that is in which its arm 114 is rotated in a counterclockwise direction from the position illustrated in Figs. 5 and 6 to a position axially aligned with the arm 130 of the member 112, becomes radially aligned with the free wiping end of the spring 230 and severs the contact between the spring arm 230 and the member 110, thus breaking the circuit through the solenoid 220 and permitting the spring means thereof to shift the speedometer change speed device 210 to its opposite position of operation.

Upon return of the sleeve 70 to the position shown in the drawings the spring finger 230 will again come in contact with the member 110 and again energize the solenoid 220 to return it to the position first described. Thus it will be appreciated that it is the movement of the member 110 coincidentally with the shifting of the sleeve 70 that controls the shiftable position of the speedometer change speed mechanism 210, and not the operation of the switch 196, this being, of course, preferable inasmuch as shifting of the switch 196 from one position to another is not usually accompanied by an immediate shifting of the sleeve 70 for the reasons previously described.

In Figs. 9 to 13, inclusive, a structure is shown which is identical to the structure shown and heretofore described except for a variation in the form of the torsion spring unit employed for transmitting the torque created by movement of the nut 164 on the screw 160 to the double armed lever 80. Accordingly, parts identical to those already described are indicated by the same numerals in Figs 9 to 13, inclusive, and a description only of the changed parts will be necessary to explain the construction of the same, the operation of the device being otherwise identical.

Referring to Figs. 9 to 13, inclusive, and particularly to Fig. 9 it will be noted that the pin 108 in this case is surrounded by a sleeve or bushing 300. A sleeve-like member 310, corresponding to the member 110 first described, rotatably surrounds the sleeve or bushing 300. A second sleeve 312 corresponding in function to the member 112 first described in turn rotatably surrounds the member 310. The member 310 is provided with an arm 314 integral therewith and corresponding with the arm 114 on the member 110, and similarly is provided with a pin 316 corresponding with the pin 116 first described and in turn carrying the ball 118.

The member 312 is provided at its axially outer end with an arm 330, corresponding with the arm 130 first described, integral therewith and operatively interconnected with the nut 164 in the same manner as in the first described construction. A preferably preloaded torsion spring 340 corresponding with the torsion spring 140 of the first described construction, surrounds the member 312. In this case the free ends of the spring 340 instead of being turned outwardly as in the first described construction are turned inwardly as at 342 and 344, respectively, thus corresponding to the ends 142 and 144 of the first described construction.

Figures 9, 10, 11, 12, 13:
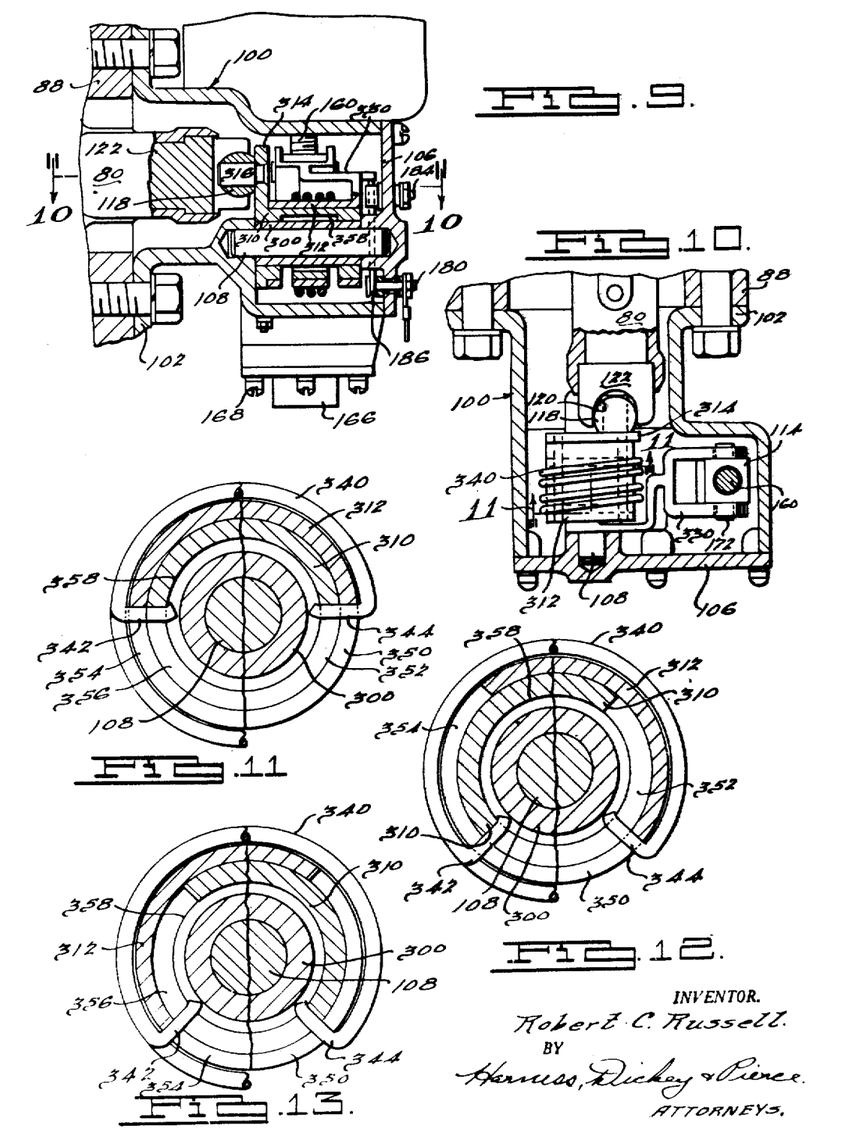

In this case the members 310 and 312 in line with the opposite bent ends 342 and 344 of the spring 340 are both slotted in a plane perpendicular to the axis of the members 310 and 312 over an angular distance sufficient for the required movements between the two members but in the case shown slightly in excess of 180°. In other words the member 312 is provided with such a slot, indicated at 350, at a point axially thereof in line with the end 344 of the spring 340 and the member 310 is provided with a radially aligned slot 352. Similarly the member 312 axially thereof in radial alignment with the end 342 is provided with such a slot 354 and the member 310 with a radially aligned such slot 356. The end 342 of the spring 340 is of such length radially of the pin 108 as to extend into the slots 354 and 356 sufficiently to engage both members 310 and 312 and similarly the end 344 is of such length radially of the pin 108 to extend into the slots 350 and 352 sufficiently to engage both members 310 and 312.

The member 310 centrally between its opposite ends has its bore relieved as at 358 and the ends 342 and 344 project into the relief 358 and are preferably bent in the direction shown so as to provide hooked ends which, in engaging the inner member 310, tend to hold the ends 342 and 344 against radially outward displacement under stress.

When the spring 340 is free of stress other than assembly preload then the parts 310 and 312 assume the normal position illustrated in Fig. 11, that is the ends of all of the slots 350, 352, 354 and 356 are aligned with the corresponding ends of each other and the spring ends 342 and 344 seat against the corresponding ends of the corresponding slots. This relationship of parts takes place after completion of each shift and is the starting point of any new shift. This relationship, normally, does not take place except at the extreme strokes of the nut, the showing in Fig. 11 not being angularly correct in this respect but is shown merely to illustrate the relative positions of the sleeves under minimum spring tension. If the nut 164 and the sleeve 70 are in the positions illustrated in the first described figures, then they assume the position illustrated in Fig. 13, that is the outer member 312 has been rotated to the extreme limit of its movement in a counterclockwise direction under the influence of the screw 160 and nut 164, the inner member 310 is at the extreme limit of its movement in a clockwise direction and is being held in such position by the friction existing between the teeth of the pinions 46 and 72 because of the transmission of torque between these members, the spring 340 being stressed so that immediately upon release of the torque referred to and, therefore, the friction between the pinions 346 and 372, the inner member 310 will be rotated in a counterclockwise direction to the same relative position of rotation as the outer member 312, at which time the members will assume the relation shown in Fig. 11 except that the members 310 and 312 will be rotated counterclockwise from the position shown in Fig. 11 to a position corresponding with the outer members 312 in Fig. 13.

Fig. 12 illustrates the position of the parts shown in Fig. 13 in the extreme opposite position, that is, where the inner member 310 has been shifted to a position in which the sleeve 70 is at the opposite end of its limit of axial movement and the outer sleeve 312 has been rotated in a clockwise direction by movement of the nut 164 to the lower end of the screw 160 and before the friction between the pinions 46 and 72 has been released sufficiently to permit the force of the spring to rotate the inner member 310 to a position corresponding with the outer member 312. It is, of course, understood that when such friction is relieved the stress of the spring 340 will rotate the inner member 310 in a clockwise direction as viewed in Fig. 12 until the parts are in the same relatively aligned condition as illustrated in Fig. 11 except rotated therefrom in a clockwise direction to correspond with the position of the outer member 312 in Fig. 12.

The spring actuating units, that is the members 110 and 112 with their corresponding spring 140, or the members 310 and 312 with their corresponding spring 340 are, of course, applicable to other uses than those specifically shown. Their importance lies in the ability to turn one member in either direction, and to amounts of angular rotation up to and in excess of 180° with respect to the other member, and to exert a correspondingly directed force on the other member.

Having thus described my invention, what I claim by Letters Patent is:

1. In combination with a part to be shifted between two limits of movement, a pair of relatively rotatable members each mounted for rotation about a common axis, a torsion spring interconnecting said members operative to exert a force to rotate one of said members in either direction of rotation upon rotation of the other of said members in said direction of rotation, said one of said members being operatively connected to said part to apply a shifting force thereto, electrically operated means interconnected with said other of said members and operative upon energization to rotate said other of said members from either limit of its rotatable position to its opposite limit of rotatable position, means operable upon said other of said members reaching either limit of its rotatable position for de-energizing said electrically operated means, said interconnection including a rotatable screw provided with a helical thread, a nut surrounding said screw and having a circumferentially extending annular groove in the bore thereof, a ball received between said groove and the groove formed between the threads of said screw, and means for limiting travel of said ball in the last mentioned groove at both limits of the desired travel of said nut axially of said screw without limiting its travel in the first mentioned groove.

2. In combination with a part to be shifted between two limits of movement, an arm operatively connected to said part for effecting shifting movement thereof, a nut operatively connected to said arm, a vertically directed screw projecting through said nut, a reversible motor operatively connected to said screw operable to rotate said screw in either direction of rotation, said screw having a helical groove therein, said nut having an annular groove in the bore thereof, a ball interposed between said grooves and substantially fitting the same, means limiting travel of said ball between predetermined points in the length of the first mentioned groove without limiting its travel in the second mentioned groove, and means co-operating between said nut and screw when said ball has reached its upper limit of its travel in said groove in said screw preventing free relative rotational movement between said nut and screw.

3. In combination with a part to be shifted between two limits of movement, an arm operatively connected to said part for effecting shifting movement thereof, a nut operatively connected to said arm, a vertically directed screw projecting through said nut, a reversible motor operatively connected to said screw operable to rotate said screw in either direction of rotation, said screw having a helical groove therein, said nut having an annular groove in the bore thereof, a ball interposed between said grooves and substantially fitting the same, means limiting travel of said ball between predetermined points in the length of the first mentioned groove without limiting its travel in the second mentioned groove, means co-operating between said nut and screw when said ball has reached its upper limit of its travel in said groove in said screw preventing free relative rotational movement between said nut and screw comprising a noncircular portion fixed with respect to said screw, and a resilient finger carried by said nut and movable into stressed engagement with said noncircular portion when said ball approaches said upper limit.

4. In combination, a pair of relatively rotatable sleeves arranged in telescoping relation with respect to each other, each of said sleeves having a pair of axially spaced slots therein each arranged in a plane substantially perpendicular to the axis of said sleeve, said slots in one of said sleeves being radially aligned with the slots in the other of said sleeves, a torsion spring substantially concentric with the axes of said sleeves, a free end portion on said spring projecting through one set of radially aligned slots of both of said members, and a second free end portion on said spring extending through the other set of said radially aligned slots of both said members.

5. In combination, a pair of relatively rotatable members arranged in telescoping relation with respect to each other, each of said members having a pair of slots therein spaced from one another axially of said member, and each disposed substantially in a plane perpendicular to the axes of said members, the axial spacing of said slots in one of said members being substantially the same as the axial spacing of said slots in the other of said members and corresponding slots in said members being arranged in radial alignment with each other, said slots extending through at least 180° about the axes of said members, a torsion spring concentric with said members and having opposite free end portions, one of said free end portions projecting through corresponding slots of both of said members and the other of said free end portions projecting through the remaining slots of both of said members.

6. Mechanism for shifting a power transmitting element between two power transmitting positions comprising a pair of axially aligned relatively rotatable members, means coupling one of the members to the power transmitting element, torsion spring means operatively interconnecting said members operable to transmit a turning force from the other of said members to said one of said members when said other of said members is rotated in either direction of rotation without a corresponding rotation movement of said one of said members, a power screw having a part connected to said other of said members operative to rotate said other of said members to build up a turning force on said one of said members operative to shift the power transmitting element upon the cessation of the transmission of a material amount of power therethrough, and a motor connected to another part of the screw for effecting rotation thereof in either direction.

7. In combination with a power transmitting mechanism including a member shiftable between two operative positions and through which power is transmitted when in either of said positions, said member being so constructed and arranged and so cooperating with parts drivingly engaged thereby in either of said operative positions as to be substantially locked against shifting movement while a material amount of power is being transmitted therethrough, means for shifting said shiftable member including a rotatable member interconnected thereto for simultaneous movement therewith, a second rotatable member concentric with the first-mentioned rotatable member and rotatable independently thereof, torsion spring means interconnecting said rotatable members so constructed and arranged that rotation of the second-mentioned rotatable member in either direction of rotation applies through said spring means a turning force on the first-mentioned rotatable member in a corresponding direction without necessitating simultaneous rotation of said first-mentioned rotatable member, and power operated means for turning said second-mentioned rotatable member in either direction of rotation independently of rotatable movement of said first-mentioned rotatable member, whereby a turning force may be built up on said first-mentioned rotatable member independently of movement of said shiftable member, thereby to effect shifting of said shiftable member immediately upon the cessation of the transmission of material amounts of power therethrough.

8. In combination with a power transmitting mechanism including a member shiftable between two operative positions and through which power is transmitted when in either of said positions, said member being so constructed and arranged and so cooperating with parts drivingly engaged thereby in either of said operative positions as to be substantially locked against shifting movement while a material amount of power is being transmitted therethrough, means for shifting said shiftable member including a rotatable member interconnected thereto for simultaneous movement therewith, a second rotatable member concentric with the first-mentioned rotatable member and rotatable independently thereof, torsion spring means interconnecting said rotatable members so constructed and arranged that rotation of the second-mentioned rotatable member in either direction of rotation applies through said spring means a turning force on the first-mentioned rotatable member in a corresponding direction without necessitating simultaneous rotation of said first-mentioned rotatable member, and power operated means for turning said second-mentioned rotatable member in either direction of rotation independently of rotatable movement of said first-mentioned rotatable member comprising a nut member operatively connected to the second-mentioned rotatable member in eccentric relation with respect to the axis of rotation thereof, a screw member operatively engaging said nut member, and a reversible electric motor drivingly connected to said screw member, whereby a turning force may be built up on said first-mentioned rotatable member independently of movement of said shiftable member, thereby to effect shifting of said shiftable member immediately upon the cessation of the transmission of material amounts of power therethrough.

9. In combination with a power transmitting mechanism including a member shiftable between two operative positions and through which power is transmitted when in either of said positions, said member being so constructed and arranged and so cooperating with parts drivingly engaged thereby in either of said operative positions as to be substantially locked against shifting movement while a material amount of power is being transmitted therethrough, means for shifting said shiftable member including a rotatable member interconnected thereto for simultaneous movement therewith, a second rotatable member concentric with the first-mentioned rotatable member and rotatable independently thereof, torsion spring means interconnecting said rotatable members so constructed and arranged that rotation of the second-mentioned rotatable member in either direction of rotation applies through said spring means a turning force on the first-mentioned rotatable member in a corresponding direction without necessitating simultaneous rotation of said first-mentioned rotatable member, and power operated means for turning said second-mentioned rotatable member in either direction of rotation independently of rotatable movement of said first-mentioned rotatable member comprising an arm fixed with respect to said second-mentioned rotatable member, a nut member non-rotatably associated with said arm, a screw member projecting through said nut member, said nut member having a circumferentially arranged groove in the bore thereof, a ball received simultaneously in said groove and in the space between the threads of said screw, and a reversible electric motor drivingly connected to said screw for effecting rotation thereof in either direction, whereby a turning force may be built up on said first-mentioned rotatable member independently of movement of said shiftable member, thereby to effect shifting of said shiftable member immediately upon the cessation of the transmission of material amounts of power therethrough.

10. In combination with a power transmitting mechanism including a member shiftable between two operative positions and through which power is transmitted when in either of said positions, said member being so constructed and arranged and so cooperating with parts drivingly engaged thereby in either of said operative positions as to be substantially locked against shifting movement while a material amount of power is being transmitted therethrough, means for shifting said shiftable member including a rotatable member interconnected thereto for simultaneous movement therewith, a second rotatable member concentric with the first-mentioned rotatable member and rotatable independently thereof, torsion spring means interconnecting said rotatable members so constructed and arranged that rotation of the second-mentioned rotatable member in either direction of rotation applies through said spring means a turning force on the first-mentioned rotatable member in a corresponding direction without necessitating simultaneous rotation of said first-mentioned rotatable member, and power-operated means for turning said second-mentioned rotatable member in either direction of rotation, independently of rotatable movement of said first-mentioned rotatable member comprising an arm fixed with respect to said second-mentioned rotatable member, a nut member operatively associated with said arm, a screw member projecting through said nut member, said nut member having a circumferentially arranged groove in the bore thereof, and a ball received simultaneously in said groove and in the space between the threads of said screw, means fixed with respect to said screw for limiting the movement of said ball in said space between the threads of said screw between predetermined limits axially of said screw, and a reversible electric motor drivingly connected to said screw for effecting rotation thereof in either direction whereby a turning force may be built up on said first-mentioned rotatable member independently of movement of said shiftable member, thereby to effect shifting of said shiftable member immediately upon the cessation of the transmission of material amounts of power therethrough.

11. In combination with a power transmitting mechanism including a member shiftable between two operative positions and through which power is transmitted when in either of said positions, said member being so constructed and arranged and so cooperating with parts drivingly engaged thereby in either of said operative positions as to be substantially locked against shifting movement while a material amount of power is being transmitted therethrough, means for shifting said shiftable member including a rotatable member interconnected thereto for simultaneous movement therewith, a second rotatable member concentric with the first-mentioned rotatable member and rotatable independently thereof, torsion spring means interconnecting said rotatable members so constructed and arranged that rotation of the second-mentioned rotatable member in either direction of rotation applies through said spring means a turning force on the first-mentioned rotatable member in a corresponding direction without necessitating simultaneous rotation of said first-mentioned rotatable member, and power operated means for turning said second-mentioned member in either direction of rotation independently of rotatable movement of said first-mentioned rotatable member comprising an arm fixed with respect to said second-mentioned rotatable member, a nut member carried by said arm in eccentric relation with respect to the axis of rotation of said second-mentioned rotatable member, said nut member having a plurality of axially spaced, circumferentially directed grooves in the bore thereof, a screw projecting through said bore of said nut member, a ball received in each of said grooves and simultaneously received in the space between the threads of said nut member, a cage interposed between said screw and the bore of said nut member operatively engaging said balls to maintain them in predetermined angular relation with respect to each other, means fixed axially with respect to said screw operative to limit movement of said balls axially of said screw between predetermined limits without limiting their travel in said grooves, and a reversible electric motor drivingly connected to said screw, whereby a turning force may be built up on said first-mentioned rotatable member independently of movement of said shiftable member, thereby to effect shifting of said shiftable member immediately upon the cessation of the transmission of material amounts of power therethrough.

12. In combination with a power transmitting mechanism including a member shiftable between two operative positions and through which power is transmitted when in either of said positions, said member being so constructed and arranged and so cooperating with parts drivingly engaged thereby in either of said operative positions as to be substantially locked against shifting movement while a material amount of power is being transmitted therethrough, means for shifting said shiftable member including a rotatable member interconnected thereto for simultaneous movement therewith, a second rotatable member concentric with the first-mentioned rotatable member and rotatable independently thereof, torsion spring means interconnecting said rotatable members so constructed and arranged that rotation of the second-mentioned rotatable member in either direction of rotation applies through said spring means a turning force on the first-mentioned rotatable member in a corresponding direction without necessitating simultaneous rotation of said first-mentioned rotatable member, and power operated means for turning said second-mentioned rotatable member in either direction of rotation independently of rotatable movement of said first-mentioned rotatable member comprising an arm fixed with respect to said second-mentioned rotatable member, a nut member carried by said arm in eccentric relation with respect to the axis of rotation of said second-mentioned rotatable member, said nut member having a plurality of axially spaced, circumferentially directed grooves in the bore thereof, a generally vertically directed screw projecting through said bore of said nut member, a ball received in each of said grooves and simultaneously received in the space between the threads of said nut member, a cage interposed between said screw and the bore of said nut member operatively engaging said balls to maintain them in predetermined angular relation with respect to each other, means fixed axially with respect to said screw operative to limit movement of said balls axially of said screw between predetermined limits without limiting their travel in said grooves, means cooperating between said nut member and said screw when said balls have reached the upper limit of their travel between the threads of said screw preventing free relative rotational movement between said nut member and screw, and a reversible electric motor drivingly connected to said screw, whereby a turning force may be built up on said first-mentioned rotatable member independently of movement of said shiftable member, thereby to effect shifting of said shiftable member immediately upon the cessation of the transmission of material amounts of power therethrough.

13. In combination with a power transmitting mechanism including a member shiftable between two operative positions and through which power is transmitted when in either of said positions, said member being so constructed and arranged and so cooperating with parts drivingly engaged thereby in either of said operative positions as to be substantially locked against shifting movement while a material amount of power is being transmitted therethrough, means for shifting said shiftable member including a rotatable member interconnected thereto for simultaneous movement therewith, a second rotatable member concentric with the first mentioned rotatable member and rotatable independently thereof, torsion spring means interconnecting said rotatable members so constructed and arranged that rotation of the second mentioned rotatable member in either direction of rotation applies through said spring means a turning force on the first mentioned rotatable member in a corresponding direction without necessitating simultaneous rotation of said first mentioned rotatable member, and power operated means for turning said second mentioned rotatable member in either direction of rotation independently of rotatable movement of said first mentioned rotatable member comprising an arm fixed with respect to said second mentioned rotatable member, a nut member carried by said arm in eccentric relation with respect to the axis of rotation of said second mentioned rotatable member, said nut member having a plurality of axially spaced, circumferentially directed grooves in the bore thereof, a generally vertically directed screw projecting through said bore of said nut member, a ball received in each of said grooves and simultaneously received in the space between the threads of said nut member, a cage interposed between said screw and the bore of said nut member operatively engaging said balls to maintain them in predetermined angular relation with respect to each other, means fixed axially with respect to said screw operative to limit movement of said balls axially of said screw between predetermined limits without limiting their travel in said grooves, means cooperating between said nut member and said screw when said balls have reached the upper limit of their travel between the threads of said screw preventing free relative rotational movement between said nut member and screw comprising a non-circular portion fixed with respect to said screw and a resilient finger carried by said nut and movable into stressed engagement with said non-circular portion when said balls approach said upper limit, and a reversible electric motor drivingly connected to said screw, whereby a turning force may be built up on said first mentioned rotatable member independently of movement of said shiftable member, thereby to effect shifting of said shiftable member immediately upon the cessation of the transmission of material amounts of power therethrough.

14. In combination with a power transmitting mechanism including a member shiftable between two operative positions and through which power is transmitted when in either of said positions, said member being so constructed and arranged and so cooperating with parts drivingly engaged thereby in either of said operative positions as to be substantially locked against shifting movement while a material amount of power is being transmitted therethrough, means for shifting said shiftable member including a rotatable member interconnected thereto for simultaneous movement therewith, a second rotatable member concentric with the first mentioned rotatable member and rotatable independently thereof, torsion spring means interconnecting said rotatable members so constructed and arranged that rotation of the second mentioned rotatable member in either direction of rotation applies through said spring means a turning force on the first mentioned rotatable member in a corresponding direction without necessitating simultaneous rotation of said first mentioned rotatable member, and power operated means for turning said second mentioned rotatable member in either direction of rotation independently of rotatable movement of said first mentioned rotatable member comprising a nut member operatively connected to the second mentioned rotatable member in eccentric relation with respect to the axis of rotation thereof, a screw member operatively engaging said nut member, and a reversible electric motor drivingly connected to said screw member, control means for said motor including a switch operable to energize said motor and to determine the direction of rotation thereof, and means controlled by the rotational movement of said other of said members for deenergizing said motor when said other of said members has reached either limit of its rotatable position.

15. In combination with a power transmitting mechanism including a member shiftable between two operative positions and through which power is transmitted when in either of said positions, said member being so constructed and arranged and so cooperating with parts drivingly engaged thereby in either of said operative positions as to be substantially locked against shifting movement while a material amount of power is being transmitted therethrough, means for shifting said shiftable member including a rotatable member interconnected thereto for simultaneous movement therewith, a second rotatable member concentric with the first mentioned rotatable member and rotatable independently thereof, torsion spring means interconnecting said rotatable members so constructed and arranged that rotation of the second mentioned rotatable member in either direction of rotation applies through said spring means a turning force on the first mentioned rotatable member in a corresponding direction without necessitating simultaneous rotation of said first mentioned rotatable member, and power operated means for turning said second mentioned rotatable member in either direction of rotation independently of rotatable movement of said first mentioned rotatable member comprising a nut member operatively connected to the second mentioned rotatable member in eccentric relation with respect to the axis of rotation thereof, a screw member operatively engaging said nut member, and a reversible electric motor drivingly connected to said screw member, switch means electrically connected with said motor operable to energize said motor to rotate in either direction of rotation, means in the electrical connection between said switch means and said motor operable to open that circuit to the said motor controlling the direction of rotation in one direction when said other of said parts has reached one limit of its rotatable position and to open that circuit controlling the direction of rotation of said motor in the opposite direction when said other of said members has reached its limit of rotation in the opposite direction, and means carried by said other of said members operatively associated with the last-mentioned means to open that circuit for said motor which is energized to rotate said motor in a direction of rotation as determined by said switch means.

16. In combination with a power transmitting mechanism including a member shiftable between two operative positions and through which power is transmitted when in either of said positions, said member being so constructed and arranged and so cooperating with parts drivingly engaged whereby in either of said operative positions as to be substantially locked against shifting movement while a material amount of power is being transmitted therethrough, means for shifting said shiftable member including a pair of relatively rotatable sleeves arranged in telescoping relation with respect to each other, each of said sleeves having a pair of axially spaced slots therein each arranged in a plane substantially perpendicular to the axis of said sleeve, said slots in one of said sleeves being radially aligned with the slots in the other of said sleeves, a torsion spring substantially concentric with the axes of said sleeves, a free end portion on said spring projecting through one set of radially aligned slots of both of said members, a second free end portion on said spring extending through the other set of said radially aligned slots of both said members, and power operated means for turning said second mentioned rotatable member in either direction of rotation independently of rotatable movement of said first mentioned rotatable member comprising a nut member operatively connected to the second mentioned rotatable member in eccentric relation with respect to the axis of rotation thereof, a screw member operatively engaging said nut member, and a reversible electric motor drivingly connected to said screw member, whereby a turning force may be built up on said first mentioned rotatable member independently of movement of said shiftable member, thereby to effect shifting of said shiftable member immediately upon the cessation of the transmission of material amounts of power therethrough.

17. In a geared power transmitting mechanism, a toothed power transmitting member, a shiftable mating toothed member adapted for movement into and out of power transmitting relation to the first member, a movable operating element for moving said last member into and out of power transmitting relation to said first member, a driving element movable relative to the operating element, a spring connecting said elements for exerting a force on said operating element in a direction tending to cause said mating member to move out of power transmitting relation to the other member when the operating element is moved in one direction, said spring being capable when distorted by displacement of the driving member in said one direction of storing sufficient energy to shift said mating member out of power transmitting relation when the load transmitted through said mechanism falls below a given value, electrical power operating means, and power transmitting means operatively connected to said electrical power operating means for moving said driving element in said one direction, said power transmitting means including means for holding said driving member in displaced position after said electrical power operating means is deenergized.

18. In a geared power transmitting mechanism, a toothed power transmitting member, a shiftable mating toothed member adapted for movement into and out of power transmitting relation to the first member, a movable operating element for moving said last member into and out of power transmitting relation to said first member, a driving element movable relative to the operating element, a spring connecting said elements for exerting a force on said operating element in a direction tending to cause said mating member to move out of power transmitting relation to the other member when the operating element is moved in one direction, said spring being capable when distorted by displacement of the driving member in said one direction of storing sufficient energy to shift said mating member out of power transmitting relation when the load transmitted through said mechanism falls below a given value, electrical power operating means, and power transmitting means operatively connected to said electrical power operating means for moving said driving element in said one direction, said power transmitting means including reversible screw means acting to hold said driving member in displaced position after said electrical power operating means is deenergized.

19. In a geared power transmitting mechanism, a pair of toothed load-carrying members, a shiftable mating toothed member adapted for movement into and out of power transmitting relation to one or the other of said pair of members by movement in opposite directions, a movable operating element for moving said shiftable member into and out of power transmitting relation to said pair of members, a driving element movable relative to the operating element, a spring connecting said elements for exerting a force on said operating element in one direction when the driving element is moved in one direction and in the opposite direction when the operating element is moved in the opposite direction, said spring being capable when distorted by displacement of the driving member in either direction of storing sufficient energy to shift said mating member out of power transmitting relation when the load transmitted through said mechanism falls below a given value, reversible electrical motor means, and power transmitting means operatively connected to said electrical motor means for moving said driving element to effect distortion of said spring means, said power transmitting means including reversible screw means acting to hold said driving member in displaced position after said electrical power operating means is deenergized.

20. In a geared power transmitting mechanism, a toothed power transmitting member, a shiftable mating toothed member adapted for movement into and out of power transmitting relation to the first member, a movable operating element for moving said last member into and out of power transmitting relation to said first member, a driving element movable relative to the operating element, a spring connecting said elements for exerting a force on said operating element in a direction tending to cause said mating member to move out of power transmitting relation to the other member when the operating element is moved in one direction, said spring being capable when distorted by displacement of the driving member in said one direction of storing sufficient energy to shift said mating member out of power transmitting relation when the load transmitted through said mechanism falls below a given value, electrical power operating means, means for energizing said electrical power operating means, automatic means for deenergizing said power operated means when the driving member is displaced to the desired degree, and power transmitting means operatively connected to said electrical power operating means for moving said driving element in said one direction, said power transmitting means including means for holding said driving member in displaced position after said electrical power operating means is deenergized.

ROBERT C. RUSSELL.

REFERENCES CITED

The following references are of record in the file of this patent:

UNITED STATES PATENTS

| Number | Name | Date |
|---|---|---|
| 1,748,509 | Forman | Feb. 25, 1930 |
| 2,001,337 | Wiedmaier | May 14, 1935 |
| 2,136,023 | Russell | Nov. 8, 1938 |
| 2,180,287 | Zwack | Nov. 14, 1939 |
| 2,203,057 | Moore | June 4, 1940 |
| 2,402,343 | Price | June 18, 1946 |